US012634824B2

(12) United States Patent (10) Patent No.: US 12,634,824 B2
Maleki et al. (45) Date of Patent: May 19, 2026

(54) MULTIPLE WAKE-UP-SIGNALS FOR ROBUST NR UE WAKE-UP

(71) Applicant: Telefonaktiebolaget LM Ericsson (publ), Stockholm (SE)

(72) Inventors: Sina Maleki, Malmö (SE); Ilmiawan Shubhi, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 508 days.

(21) Appl. No.: 17/421,286

(22) PCT Filed: Jan. 10, 2020

(86) PCT No.: PCT/SE2020/050017
§ 371 (c)(1),
(2) Date: Jul. 7, 2021

(87) PCT Pub. No.: WO2020/145876
PCT Pub. Date: Jul. 16, 2020

(65) Prior Publication Data
US 2022/0095231 A1 Mar. 24, 2022

Related U.S. Application Data

(60) Provisional application No. 62/791,404, filed on Jan. 11, 2019.

(51) Int. Cl.
H04W 52/02 (2009.01)

(52) U.S. Cl.
CPC ... H04W 52/0235 (2013.01); H04W 52/0216 (2013.01)

(58) Field of Classification Search
CPC ......... H04W 52/0235; H04W 52/0216; H04W 52/0209; H04W 52/0225; H04W 52/0274;
(Continued)

(56) References Cited

U.S. PATENT DOCUMENTS 11,310,740 B2 * 4/2022 Ang ...................... H04W 76/28
2018/0098287 A1 * 4/2018 Ang .................. H04W 52/0229
(Continued)

FOREIGN PATENT DOCUMENTS

WO 2018175760 A1 9/2018
WO 2018204799 A1 11/2018
WO 2020064770 A1 4/2020

OTHER PUBLICATIONS

International Search Report and Written Opinion dated Apr. 17, 2020 for International Application No. PCT/SE2020/050017 filed Jan. 10, 2020, consisting of 9-pages.
(Continued)

*Primary Examiner* — Anthony S Addy
(74) *Attorney, Agent, or Firm* — Sage Patent Group

(57) ABSTRACT

Methods and apparatuses are disclosed for wake up and/or sleep signal robustness. In one embodiment, a method for a network node includes configuring a wireless device, WD, with multiple wake/sleep signal occasions to occur before an ON duration for Discontinuous Reception, DRX; and sending at least one wake/sleep signal to the WD before the ON duration for the DRX based at least in part on the configured multiple wake/sleep signal occasions. In another embodiment, a method for a WD includes receiving a configuration of multiple wake/sleep signal occasions, the multiple wake/sleep signal occasions to occur before an ON duration for Discontinuous Reception, DRX; and detecting at least one wake/sleep signal before the ON duration for the DRX based at least in part on the configured multiple wake/sleep signal occasions.

28 Claims, 8 Drawing Sheets

(58) Field of Classification Search
    CPC ... H04W 52/02; H04W 52/04; H04W 52/143;
        H04W 52/146; H04W 52/36; H04W
        76/19; H04W 72/04; H04W 76/00; H04W
        88/08; Y02D 30/70; H04L 1/16; H04L
        5/00
    See application file for complete search history.

(56)                References Cited

U.S. PATENT DOCUMENTS

| | | | |
|---|---|---|---|
| 2018/0332533 A1 | 11/2018 | Bhattad et al. | |
| 2019/0021119 A1* | 1/2019 | Ng | H04W 48/12 |
| 2019/0254110 A1* | 8/2019 | He | H04L 5/0048 |
| 2020/0037247 A1* | 1/2020 | Liao | H04W 52/0216 |
| 2020/0037396 A1* | 1/2020 | Islam | H04W 52/0229 |
| 2020/0145921 A1* | 5/2020 | Zhang | H04W 52/0235 |
| 2020/0204292 A1* | 6/2020 | Jiang | H04W 52/0235 |
| 2020/0214078 A1* | 7/2020 | Jiang | H04W 52/0216 |
| 2021/0337507 A1* | 10/2021 | Selvaganapathy | H04W 68/02 |

OTHER PUBLICATIONS

3GPP TSG RAN WG1 Meeting #92 R1-1802331; Title: Further discussion on Wake-up signal functions; Agenda Item: 6.2.6.1.1.1; Source: Qualcomm Incorporated; Document for: Discussion and Decision; Date and Location: Feb. 26-Mar. 2, 2018, Athens, Greece, consisting of 7-pages.
European Communication Art. 94(3) for EP Application No. 20701525.6 mailed Feb. 9, 2023, 5 pages.
Sony, "Wake Up Signalling for efeMTC", 3GPP TSG RAN WG1 Meeting #90, R1-1714576, Prague, Czech Republic, Aug. 21-25, 2017, 12 pages.

\* cited by examiner

One OFDM symbol including cyclic prefix

BEGIN

Receive a configuration of multiple wake/sleep signal occasions, the multiple wake/sleep signal occasions to occur before an ON duration for Discontinuous Reception, DRX
S138

Detect at least one wake/sleep signal before the ON duration for the DRX based at least in part on the configured multiple wake/sleep signal occasions
S140

END

MULTIPLE WAKE-UP-SIGNALS FOR ROBUST NR UE WAKE-UP

TECHNICAL FIELD

Cross-Reference to Related Applications

This application is a Submission Under 35 U.S.C. § 371 for U.S. National Stage Patent Application of International Application No.: PCT/SE2020/050017, filed Jan. 10, 2020 entitled "MULTIPLE WAKE-UP-SIGNALS FOR ROBUST NR UE WAKE-UP," which claims priority to U.S. Provisional Application No. 62/791,404, filed Jan. 11, 2019, entitled "MULTIPLE WAKE-UP-SIGNALS FOR ROBUST NR UE WAKE-UP," the entireties of both of which are incorporated herein by reference.

The present disclosure relates to wireless communications, and in particular, to multiple wake-up signals for robust New Radio (NR) wireless device (WD) wake-up.

BACKGROUND

The New Radio (NR) standard in 3rd Generation Partnership Project (3GPP), also referred to as 5G, is being designed to provide service for multiple use cases, such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service is for a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may include any number of 1 to 14 orthogonal frequency-division multiplexing (OFDM) symbols. It should be noted that the concepts of slot and mini-slot are not specific to a specific service meaning that a mini-slot may be used for either eMBB, URLLC, or other services.
WD Power Consumption Wireless device (WD) power consumption is a metric that should be enhanced. In general, significant power can be spent on monitoring the physical downlink control channel (PDCCH) in Long Term Evolution (LTE) based on the discontinuous reception (DRX) setting from LTE field logs. The situation can be similar in NR if similar DRX settings with traffic modelling is utilized, because the WD performs blind detection in the WD's configured control resource sets (CORESETs) to identify whether there is a PDCCH sent to the WD, and to act accordingly.

SUMMARY

Some embodiments advantageously provide methods and apparatuses for WUS and GTS robustness.

In one embodiment, a method for a network node includes configuring the WD with multiple wake/sleep signal occasions to occur before a predetermined event; and sending at least one wake/sleep signal to the WD before the predetermined event, based at least in part on the configured multiple wake/sleep signal occasions.

In another embodiment, a method for a WD includes receiving a configuration associated with multiple wake/sleep signal occasions, the multiple wake/sleep signal occasions to occur before a predetermined event; and receiving and/or detecting at least one wake/sleep signal before the predetermined event, based at least in part on the configured multiple wake/sleep signal occasions.

According to an aspect of the present disclosure, a method implemented in a network node is provided. The method includes configuring a wireless device, WD, with multiple wake/sleep signal occasions to occur before an ON duration for Discontinuous Reception, DRX. The method includes sending at least one wake/sleep signal to the WD before the ON duration for the DRX based at least in part on the configured multiple wake/sleep signal occasions.

In some embodiments of this aspect, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments of this aspect, the method further includes determining a number of the configured multiple wake/sleep signal occasions to use to send the at least one wake/sleep signal to the WD. In some embodiments of this aspect, the determining the number of the configured multiple wake/sleep signal occasions to use further includes determining the number of the configured multiple wake/sleep signal occasions to use to send the at least one wake/sleep signal to the WD before the ON duration for the DRX, based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, the method further includes determining at least one specification of the at least one wake/sleep signal to send to the WD on at least one of the configured multiple wake/sleep signal occasions. In some embodiments of this aspect, determining the at least one specification of the at least one wake/sleep signal further includes determining the at least one specification of the at least one wake/sleep signal to send to the WD on the at least one of the configured multiple wake/sleep signal occasions before the ON duration for the DRX based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal. In some embodiments of this aspect, the method further includes determining how many times the WD missed a physical downlink control channel, PDCCH, transmission; and based on the determination, adjusting at least one of a number of the configured multiple wake/sleep signal occasions to use and at least one specification of the at least one wake/sleep signal to send to the WD on at least one of the configured multiple wake/sleep signal occasions.

In some embodiments of this aspect, the multiple wake/sleep signal occasions are comprised of multiple separate or independent time-frequency resource elements, REs. In some embodiments of this aspect, the multiple separate or independent time-frequency REs are a combination of one or more search spaces with one or more control resource sets, CORESETs.

According to another aspect, a method implemented in a wireless device, WD, is provided. The method includes receiving a configuration of multiple wake/sleep signal occasions, the multiple wake/sleep signal occasions to occur before an ON duration for Discontinuous Reception, DRX. The method includes detecting at least one wake/sleep signal before the ON duration for the DRX based at least in part on the configured multiple wake/sleep signal occasions.

In some embodiments of this aspect, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments of this aspect, a number of the configured multiple wake/sleep signal occasions on which the at least one wake/sleep signal is detected before the ON duration for the DRX is based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, at least one specification of the at least one wake/sleep signal detected by the WD before the ON duration for the DRX is based at least in part on at least one of WD channel conditions, at least one channel state information, CSI, report from the WD, a WD capability, network conditions, a predetermined target miss detection rate, a predetermined target false alarm rate, an interference assessment and a selected WUS strategy. In some embodiments of this aspect, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal.

In some embodiments of this aspect, receiving the configuration of multiple wake/sleep signal occasions further comprises receiving a detection strategy; and further comprising using a detection strategy different from the received detection strategy based at least in part on a target detection performance. In some embodiments of this aspect, the multiple wake/sleep signal occasions are comprised of multiple separate or independent time-frequency resource elements, REs. In some embodiments of this aspect, the multiple separate or independent time-frequency REs are a combination of one or more search spaces with one or more control resource sets, CORESETs.

According to yet another aspect of the present disclosure, a network node configured to communicate with a wireless device, WD, is provided. The network node includes processing circuitry. The processing circuitry is configured to cause the network node to configure the WD with multiple wake/sleep signal occasions to occur before an ON duration for Discontinuous Reception, DRX. The processing circuitry is configured to cause the network node to send at least one wake/sleep signal to the WD before the ON duration for the DRX based at least in part on the configured multiple wake/sleep signal occasions.

In some embodiments of this aspect, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments of this aspect, the processing circuitry is further configured to cause the network node to determine a number of the configured multiple wake/sleep signal occasions to use to send the at least one wake/sleep signal to the WD. In some embodiments of this aspect, the processing circuitry is further configured to cause the network node to determine the number of the configured multiple wake/sleep signal occasions to use by being configured to cause the network node to determine the number of the configured multiple wake/sleep signal occasions to use to send the at least one wake/sleep signal to the WD before the ON duration for the DRX, based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, the processing circuitry is further configured to cause the network node to determine at least one specification of the at least one wake/sleep signal to send to the WD on at least one of the configured multiple wake/sleep signal occasions. In some embodiments of this aspect, the processing circuitry is further configured to cause the network node to determine the at least one specification of the at least one wake/sleep signal by being configured to cause the network node to determine the at least one specification of the at least one wake/sleep signal to send to the WD on the at least one of the configured multiple wake/sleep signal occasions before the ON duration for the DRX based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal. In some embodiments of this aspect, the processing circuitry is further configured to cause the network node to determine how many times the WD missed a physical downlink control channel, PDCCH, transmission; and based on the determination, adjust at least one of a number of the configured multiple wake/sleep signal occasions to use and at least one specification of the at least one wake/sleep signal to send to the WD on at least one of the configured multiple wake/sleep signal occasions.

In some embodiments of this aspect, the multiple wake/sleep signal occasions are comprised of multiple separate or independent time-frequency resource elements, REs. In some embodiments of this aspect, the multiple separate or independent time-frequency REs are a combination of one or more search spaces with one or more control resource sets, CORESETs.

According to another aspect of the present disclosure, a wireless device, WD, configured to communicate with a network node is provided. The WD includes processing circuitry. The processing circuitry is configured to cause the WD to receive a configuration of multiple wake/sleep signal occasions, the multiple wake/sleep signal occasions to occur before an ON duration for Discontinuous Reception, DRX. The processing circuitry is configured to cause the WD to detect at least one wake/sleep signal before the ON duration for the DRX based at least in part on the configured multiple wake/sleep signal occasions.

In some embodiments of this aspect, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments of this aspect, a number of the configured multiple wake/sleep signal occasions on which the at least one wake/sleep signal is detected before the ON duration for the DRX is based at least in part on at least one of WD channel conditions, at least one channel state information, CSI, report from the WD, a WD capability, network conditions, a predetermined target miss detection rate, a predetermined target false alarm rate, an interference assessment and a selected WUS strategy.

In some embodiments of this aspect, at least one specification of the at least one wake/sleep signal detected by the WD before the ON duration for the DRX is based at least in part on at least one of WD channel conditions, at least one channel state information, CSI, report from the WD, a WD capability, network conditions, a predetermined target miss detection rate, a predetermined target false alarm rate, an interference assessment and a selected WUS strategy. In some embodiments of this aspect, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal.

In some embodiments of this aspect, the processing circuitry is further configured to cause the WD to receive the configuration of multiple wake/sleep signal occasions by being configured to receive a detection strategy; and use a detection strategy different from the received detection strategy based at least in part on a target detection performance. In some embodiments of this aspect, the multiple wake/sleep signal occasions are comprised of multiple separate or independent time-frequency resource elements, REs. In some embodiments of this aspect, the multiple separate or independent time-frequency REs are a combination of one or more search spaces with one or more control resource sets, CORESETs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
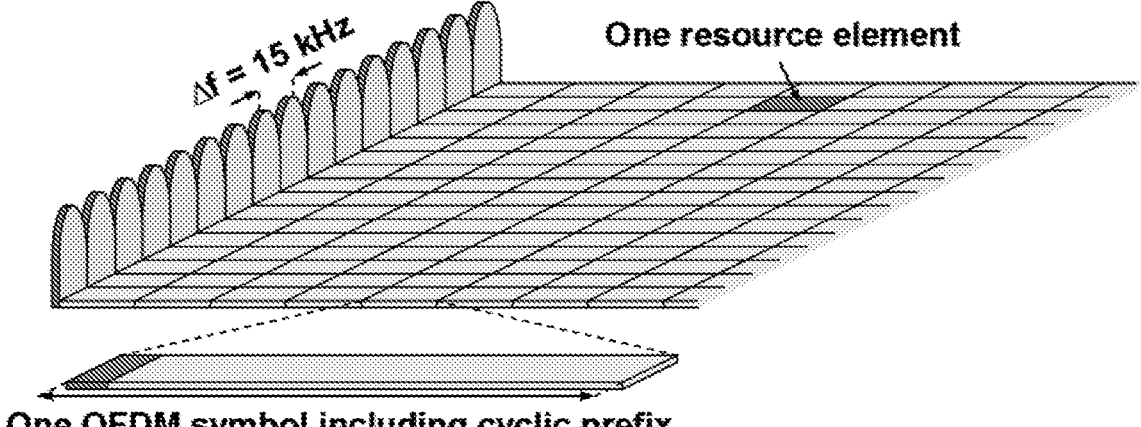
FIG. 1 illustrates an exemplary radio resource in NR.

Existing approaches for wakeup signal (WUS) design can have robustness issues. For example, if the network node sends a wakeup signal to a WD and the WD misses it due to bad coverage (for example) and remains in sleep state for extended periods of time, the network node resources are wasted and latency is increased since the network node waits until the next opportunity for the WUS transmission.

Two approaches towards WUS design are PDCCH-based approaches and sequence-based approaches. Studies have shown that increasing the bandwidth of WUS in both cases can lead to improving the miss detection rate. Nevertheless, in the case of bad coverage (or low signal-to-interference-plus-noise ratio (SINR)), even for high aggregation levels (ALs) or bandwidths, the miss detection rate may not be sufficiently low.

Furthermore, using a large bandwidth for WUS may be counterproductive, because such large bandwidth may not be necessarily be supported by all WDs, requires more system resources, and can lead to a high WD power consumption. Similar problems exist for the case of go to sleep (GTS) signals, with a difference being that in the GTS case a very low false alarm rate can be achieved.

Therefore, developing techniques that lead to improving the robustness of WUS and GTS may be beneficial. In some embodiments, the term "robust" or "robustness" may be used and may be used to indicate a desired or ideal condition in which a signal, such as a WUS or GTS is sent and/or configured in such a manner so as to be highly likely to be detected by e.g., the WD and in particular, where, for example, the miss detection rate and/or false alarm rate is low, as compared to non-robust techniques, or techniques resulting in a lesser robustness, as compared to e.g., a target rate.

Accordingly, in some embodiments of this disclosure, a multiple WUS mechanism is disclosed where the network node can configure the WD with multiple WUS occasions in separate and preferably independent resource elements (Res) in terms of time and frequency before an intended event, e.g. an ON duration or a scheduling PDCCH.

The network node may then decide to send a single WUS or multiple WUSs in each, or a subset of the occasions. The network node may further determine the rule the WD is to use to combine the multiple WUS detection, or let the WD choose the approach, subject to the condition that e.g., the target detection performance is achieved.

In some embodiments, the same principles can be applied to the GTS signals.

Some embodiments of this disclosure can advantageously lead to improving the miss detection rate of the WUS, or false alarm rate of the GTS by the WD, thereby improving the robustness issues discussed above, as compared to existing techniques.

Before describing in detail exemplary embodiments, it is noted that the embodiments reside primarily in combinations of apparatus components and processing steps related to multiple wake-up signals for robust WD wake-up. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Any two or more embodiments described in this disclosure may be combined in any way with each other.

Configuring a radio node, in particular a terminal or WD, may refer to the radio node being adapted or caused or set and/or instructed to operate according to the configuration (e.g., with WUS and/or GTS occasions). Configuring may be done by another device, e.g., a network node (e.g., network node) (for example, a base station or gNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency and/or time resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

In some embodiments, the phrase "wake/sleep signal occasions" means one or more of WUS occasions and/or GTS occasions that may be configured e.g., by a network node, for a WD to occur before a certain event, such as, for example an ON duration associated with DRX, or a scheduling PDCCH, or another event. Such event may, in some embodiments, be an event for which the WD should be awake, in the case of WUS, or asleep, in the case of GTS. In other embodiments, the event may be another type of event.

In some embodiments, the term "occasion" is used and may indicate a particular time or instant associated with an event, and/or one or more time resources and/or frequency resources and/or other radio resource. In some embodiments, the occasion may be a time resource and may correspond to any type of physical resource or radio resource expressed in terms of length of time. Examples of time resources are: symbol, time slot, mini-slot, subframe, radio frame, transmission time interval (TTI), interleaving time, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
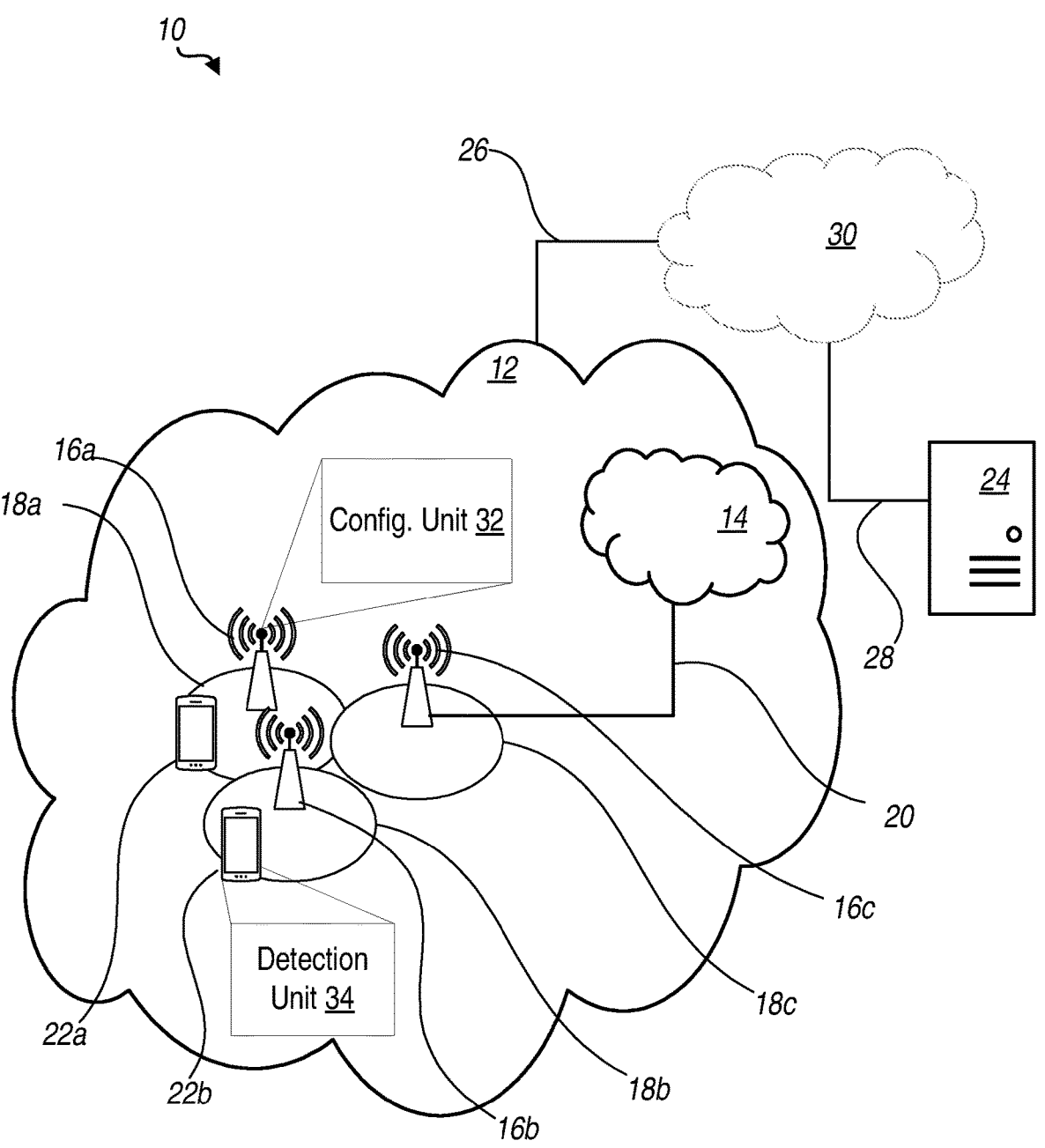
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure the WD with multiple wake/sleep signal occasions to occur before an ON duration for Discontinuous Reception, DRX; and send at least one wake/sleep signal to the WD before the ON duration for the DRX based at least in part on the configured multiple wake/sleep signal occasions. In some embodiments, network node 16 includes configuration unit 32 which is configured to configure the WD 22 with multiple wake/sleep signal occasions to occur before a predetermined event; and send at least one wake/sleep signal to the WD 22 before the predetermined event, based at least in part on the configured multiple wake/sleep signal occasions.

A wireless device 22 is configured to include a detection unit 34 which is configured to receive a configuration of multiple wake/sleep signal occasions, the multiple wake/sleep signal occasions to occur before an ON duration for Discontinuous Reception, DRX; and detect at least one wake/sleep signal before the ON duration for the DRX based at least in part on the configured multiple wake/sleep signal occasions. In some embodiments, wireless device 22 is configured to include a detection unit 34 which is configured to receive a configuration associated with multiple wake/sleep signal occasions, the multiple wake/sleep signal occasions to occur before a predetermined event; and receive and/or detect at least one wake/sleep signal before the predetermined event, based at least in part on the configured multiple wake/sleep signal occasions.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16, such as with respect to FIG. 8 and the other figures herein. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to configure the WD 22 with multiple wake/sleep signal occasions to occur before a predetermined event; and send, such as via radio interface 62, at least one wake/sleep signal to the WD 22 before the predetermined event, based at least in part on the configured multiple wake/sleep signal occasions.

In some embodiments, the at least one wake/sleep signal is one of at least one wake-up signal (WUS) and at least one go-to-sleep (GTS) and the multiple wake/sleep signal occasions are one of multiple WUS occasions and multiple GTS occasions. In some embodiments, the processing circuitry 68 is further configured to determine whether to use a subset or all of the configured multiple wake/sleep signal occasions to send the at least one wake/sleep signal to the WD 22. In some embodiments, the processing circuitry 68 is further configured to at least one of configure the WD 22 with multiple wake/sleep signal occasions and determine whether to use a subset or all of the configured multiple wake/sleep signal occasions based on at least one of WD channel conditions, WD capabilities, network conditions, a predetermined target miss detection rate, a predetermined target false alarm rate, an interference assessment, and a selected WUS strategy.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

Figure 9:
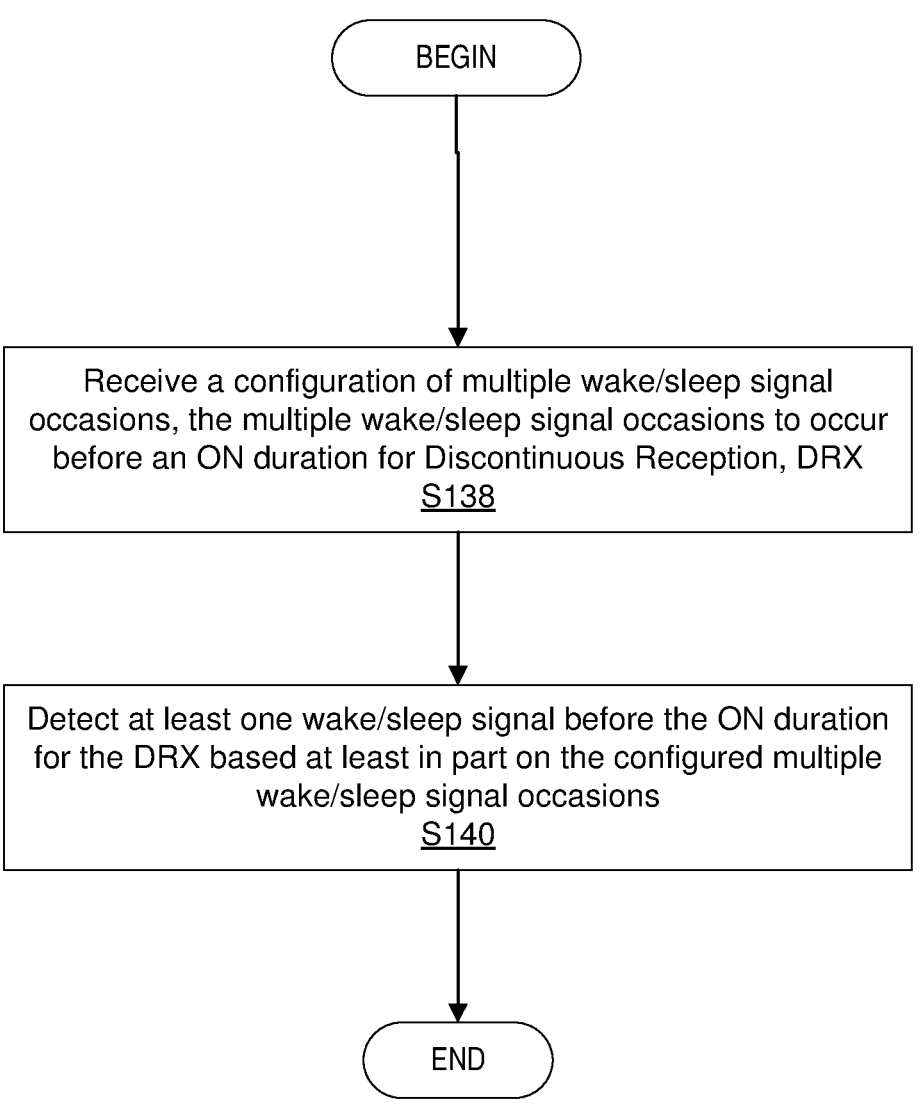
FIG. 9 is a flowchart of an exemplary process in a wireless device for detection unit according to some embodiments of the present disclosure.

The processing circuitry 84 may be configured to control any of the methods and/or processes described herein and/or to cause such methods, and/or processes to be performed, e.g., by WD 22, such as with respect to FIG. 9 and the other figures herein. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a detection unit 34 configured to receive, such as via radio interface 82, a configuration associated with multiple wake/sleep signal occasions, the multiple wake/sleep signal occasions to occur before a predetermined event; and receive and/or detect, such as via radio interface 82 and/or processing circuitry 84, at least one wake/sleep signal before the predetermined event, based at least in part on the configured multiple wake/sleep signal occasions.

In some embodiments, the received configuration includes a detection strategy for the WD 22 and the processing circuitry 84 is further configured to use a detection strategy different from the received configured detection strategy based on a target detection performance. In some embodiments, the at least one wake/sleep signal is one of at least one wake-up signal (WUS) and at least one go-to-sleep (GTS) and the multiple wake/sleep signal occasions are one of multiple WUS occasions and multiple GTS occasions. In some embodiments, the received at least one wake/sleep signal is one of a subset and all of the configured multiple wake/sleep signal occasions. In some embodiments, at least one of the configured multiple wake/sleep signal occasions and the received at least one wake/sleep signal is based on at least one of WD channel conditions, WD capabilities, network conditions, a predetermined target miss detection rate, a predetermined target false alarm rate, an interference assessment, and a selected WUS strategy.

Figure 3:
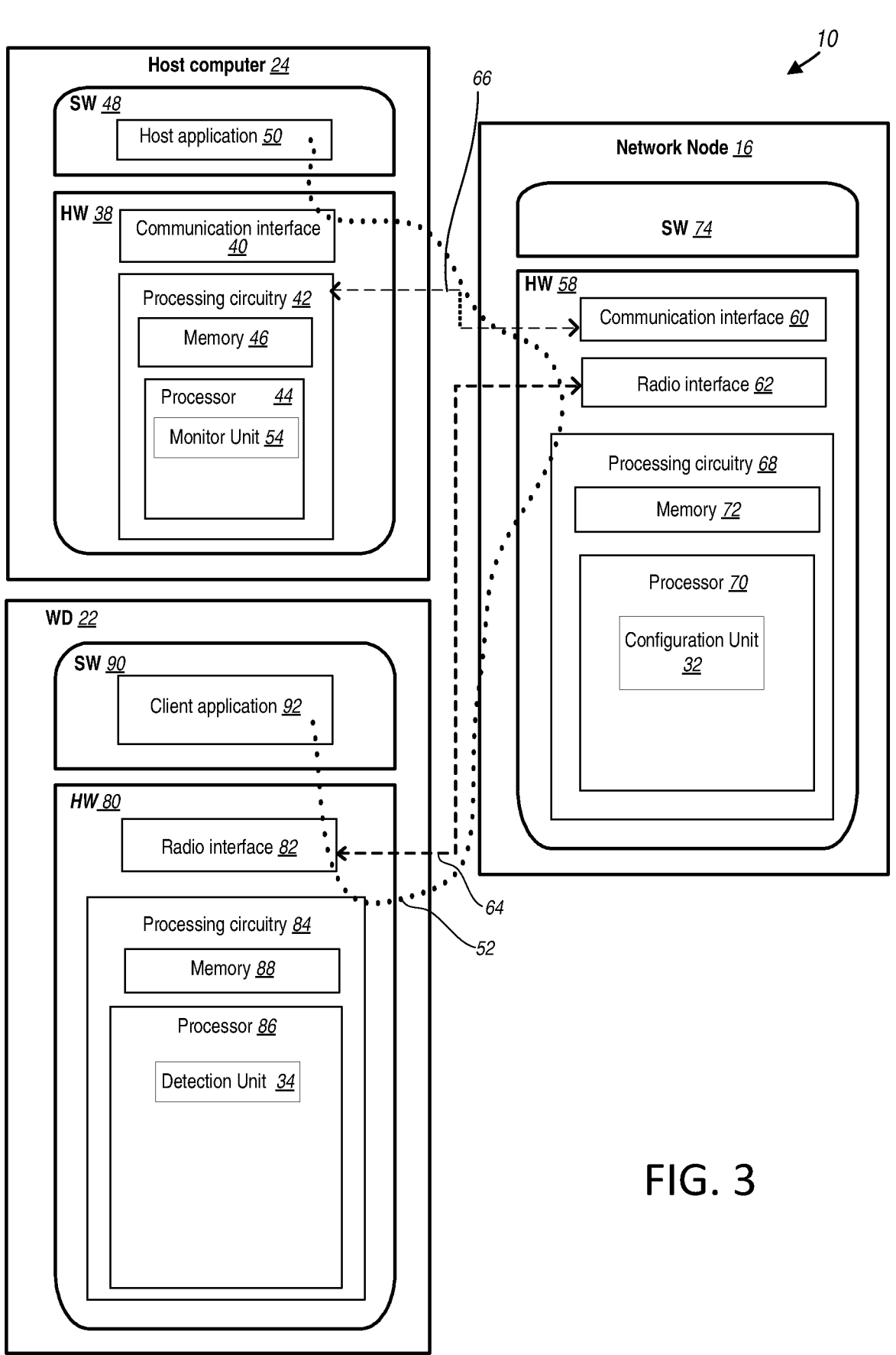
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and detection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
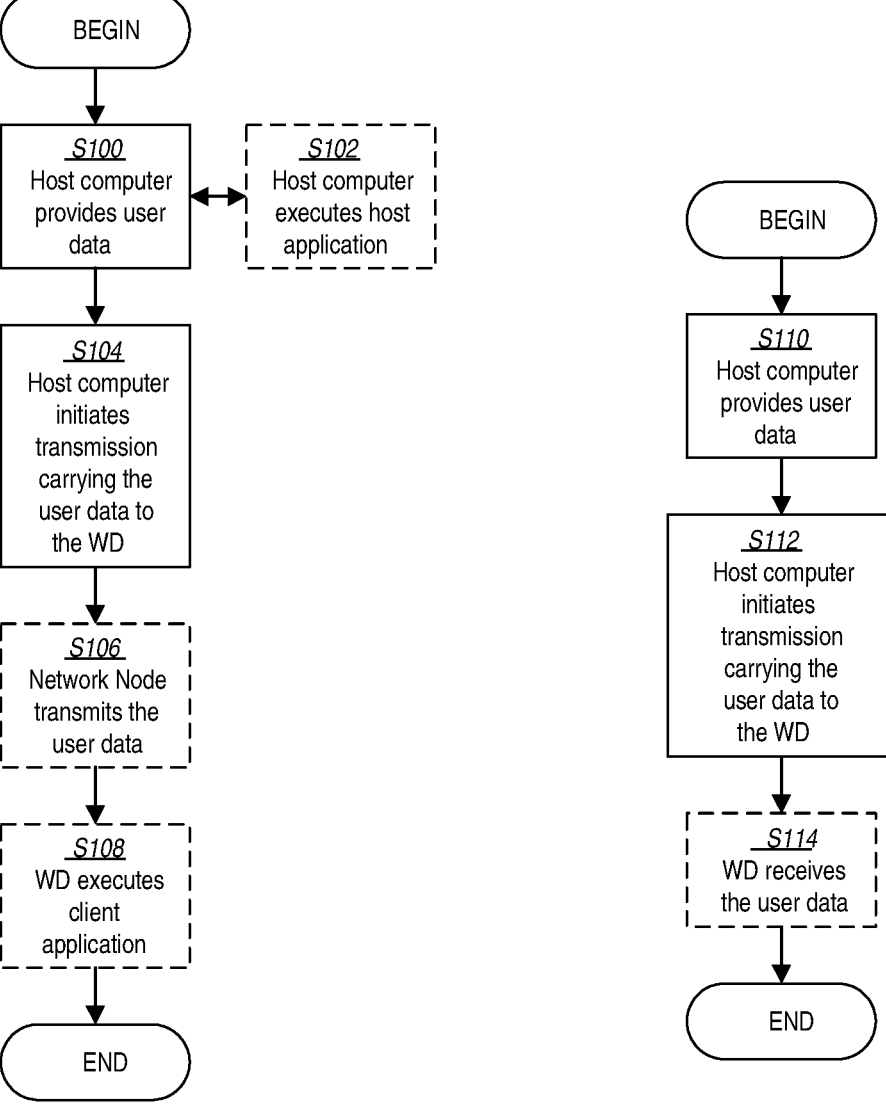
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
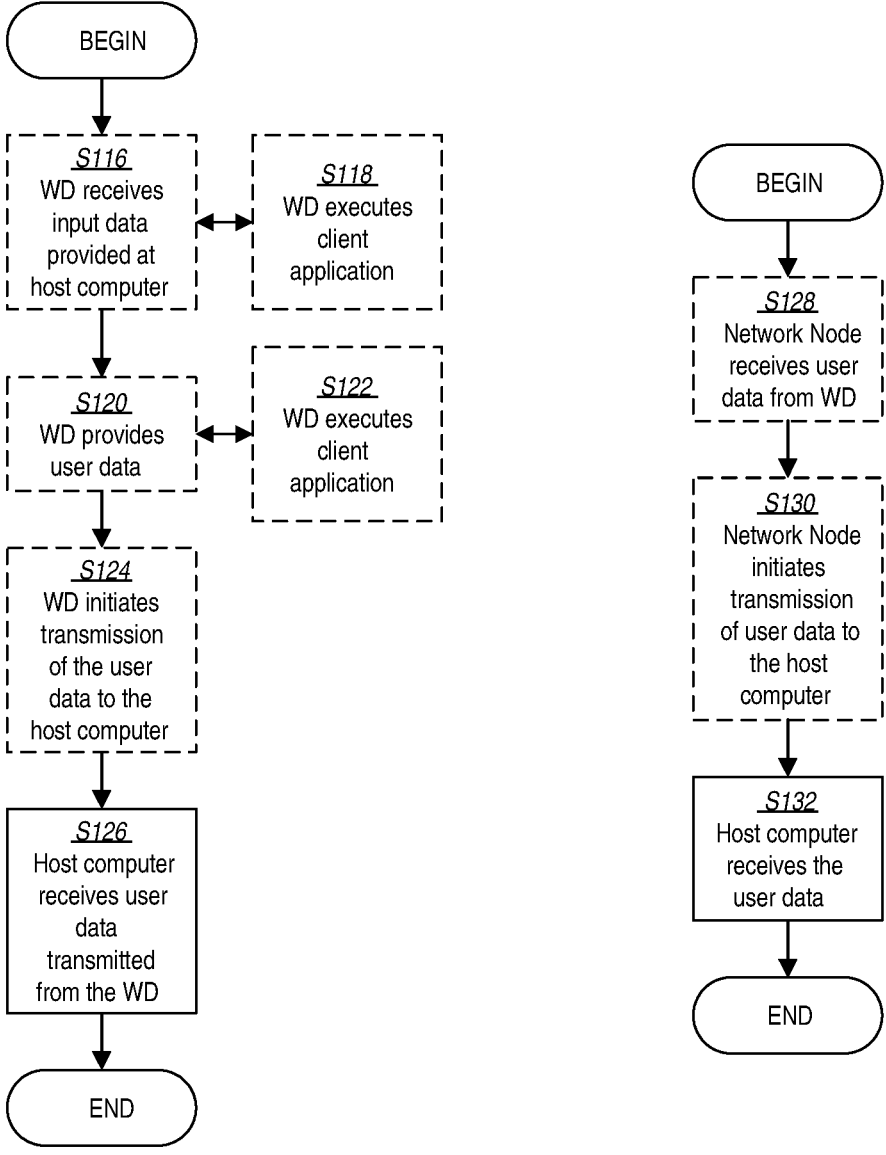
FIG. 6 is a flowchart illustrating exemplary methods implemented in a communication system including a host computer, a network node and a wireless device for receiving user data from the wireless device at a host computer according to some embodiments of the present disclosure.
FIG. 7 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
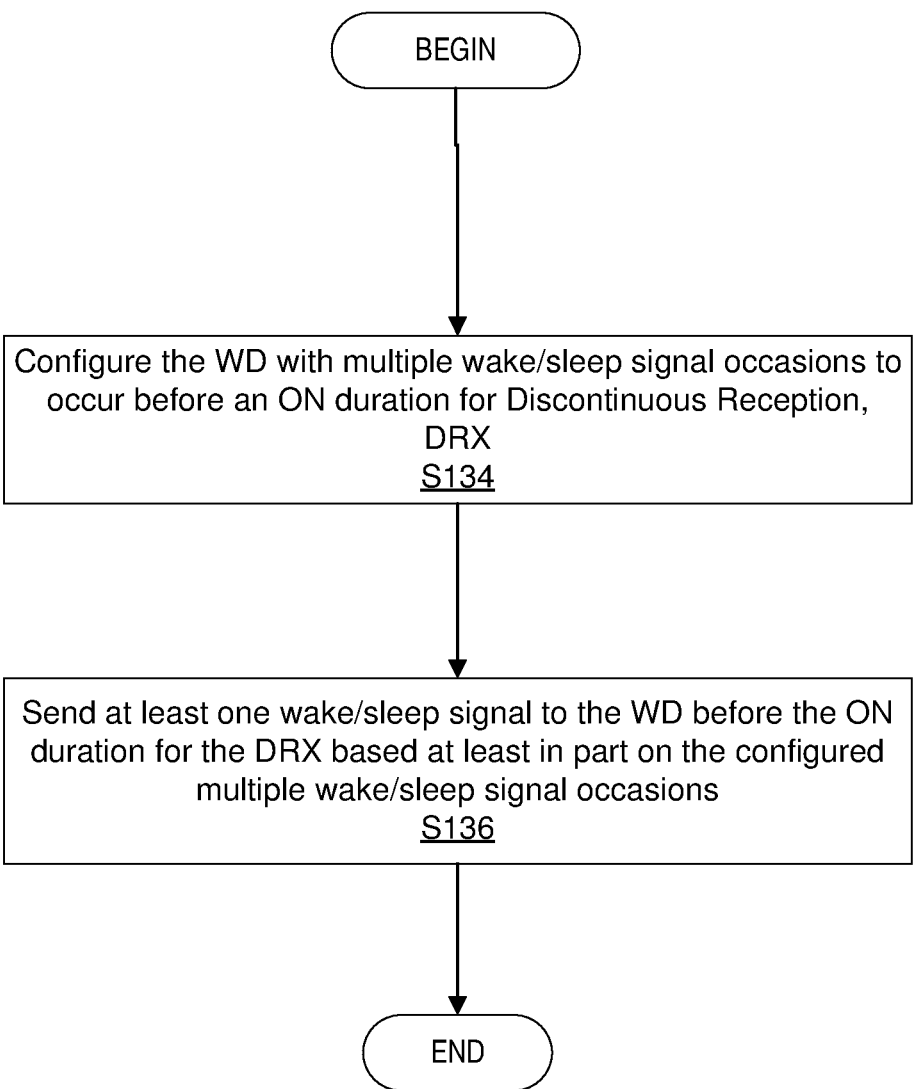
FIG. 8 is a flowchart of an exemplary process in a network node for configuration unit according to some embodiments of the present disclosure.

FIG. 8 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, communication interface 60, etc. according to the example method. The method includes configuring (Block S134), such as by configuration unit 32, processing circuitry 68, processor 70, radio interface 62, and/or communication interface 60, a wireless device, WD 22, with multiple wake/sleep signal occasions to occur before an ON duration for Discontinuous Reception, DRX. The method includes sending (Block S136), such as by configuration unit 32, processing circuitry 68, processor 70, radio interface 62, and/or communication interface 60, at least one wake/sleep signal to the WD 22 before the ON duration for the DRX based at least in part on the configured multiple wake/sleep signal occasions.

In some embodiments, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments, the method further includes determining, such as by configuration unit 32, processing circuitry 68, processor 70, radio interface 62, and/or communication interface 60, a number of the configured multiple wake/sleep signal occasions to use to send the at least one wake/sleep signal to the WD 22.

In some embodiments, the determining the number of the configured multiple wake/sleep signal occasions to use further includes determining, such as by configuration unit 32, processing circuitry 68, processor 70, radio interface 62, and/or communication interface 60, the number of the configured multiple wake/sleep signal occasions to use to send the at least one wake/sleep signal to the WD 22 before the ON duration for the DRX, based at least in part on at least one of WD channel conditions, at least one channel state information, CSI, report from the WD 22, a WD capability, network conditions, a predetermined target miss detection rate, a predetermined target false alarm rate, an interference assessment and a selected WUS strategy.

In some embodiments, the method further includes determining, such as by configuration unit 32, processing circuitry 68, processor 70, radio interface 62, and/or communication interface 60, at least one specification of the at least one wake/sleep signal to send to the WD 22 on at least one of the configured multiple wake/sleep signal occasions. In some embodiments, determining the at least one specification of the at least one wake/sleep signal further includes determining, such as by configuration unit 32, processing circuitry 68, processor 70, radio interface 62, and/or communication interface 60, the at least one specification of the at least one wake/sleep signal to send to the WD 22 on the at least one of the configured multiple wake/sleep signal occasions before the ON duration for the DRX based at least in part on at least one of WD channel conditions, at least one channel state information, CSI, report from the WD 22, a WD capability, network conditions, a predetermined target miss detection rate, a predetermined target false alarm rate, an interference assessment and a selected WUS strategy.

In some embodiments, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal. In some embodiments, the method further includes determining, such as by configuration unit 32, processing circuitry 68, processor 70, radio interface 62, and/or communication interface 60, how many times the WD 22 missed a physical downlink control channel, PDCCH, transmission; and based on the determination, adjusting, such as by configuration unit 32, processing circuitry 68, processor 70, radio interface 62, and/or communication interface 60, at least one of a number of the configured multiple wake/sleep signal occasions to use and at least one specification of the at least one wake/sleep signal to send to the WD 22 on at least one of the configured multiple wake/sleep signal occasions.

In some embodiments, the multiple wake/sleep signal occasions are comprised of multiple separate or independent time-frequency resource elements, REs. In some embodiments, the multiple separate or independent time-frequency REs are a combination of one or more search spaces with one or more control resource sets, CORESETs.

In some embodiments, the example method includes configuring, such as via configuration unit 32 in processing circuitry 68, the WD 22 with multiple wake/sleep signal occasions to occur before a predetermined event. The method includes sending, such as via radio interface 62, at least one wake/sleep signal to the WD 22 before the predetermined event, based at least in part on the configured multiple wake/sleep signal occasions.

In some embodiments, the at least one wake/sleep signal is one of at least one wake-up signal (WUS) and at least one go-to-sleep (GTS) and the multiple wake/sleep signal occasions are one of multiple WUS occasions and multiple GTS occasions. In some embodiments, the method further includes determining, such as via configuration unit 32 in processing circuitry 68, whether to use a subset or all of the configured multiple wake/sleep signal occasions to send the at least one wake/sleep signal to the WD 22. In some embodiments, at least one of the configuring the WD 22 with multiple wake/sleep signal occasions and the determining whether to use a subset or all of the configured multiple wake/sleep signal occasions is based on at least one of WD channel conditions, WD capabilities, network conditions, a predetermined target miss detection rate, a predetermined target false alarm rate, an interference assessment, and a selected WUS strategy.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by detection unit 34 in processing circuitry 84, processor 86, radio interface 82, etc., according to the example method. The method includes receiving (Block S138), such as by detection unit 34, processing circuitry 84, processor 86 and/or radio interface 82, a configuration of multiple wake/sleep signal occasions, the multiple wake/sleep signal occasions to occur before an ON duration for Discontinuous Reception, DRX. The method includes detecting (Block S140), such as by detection unit 34, processing circuitry 84, processor 86 and/or radio interface 82, at least one wake/sleep signal before the ON duration for the DRX based at least in part on the configured multiple wake/sleep signal occasions.

In some embodiments, the at least one wake/sleep signal is one of at least one wake-up signal, WUS, and at least one go-to-sleep, GTS, and the multiple wake/sleep signal occasions are one of multiple WUS occasions and multiple GTS occasions. In some embodiments, a number of the configured multiple wake/sleep signal occasions on which the at least one wake/sleep signal is detected before the ON duration for the DRX is based at least in part on at least one of WD channel conditions, at least one channel state information, CSI, report from the WD 22, a WD capability, network conditions, a predetermined target miss detection rate, a predetermined target false alarm rate, an interference assessment and a selected WUS strategy.

In some embodiments, at least one specification of the at least one wake/sleep signal detected by the WD 22 before the ON duration for the DRX is based at least in part on at least one of WD channel conditions, at least one channel state information, CSI, report from the WD 22, a WD capability, network conditions, a predetermined target miss detection rate, a predetermined target false alarm rate, an interference assessment and a selected WUS strategy. In some embodiments, the at least one specification of the at least one wake/sleep signal includes at least one of an aggregation level, AL, of the at least one wake/sleep signal, a search space, SS, associated with the at least one wake/sleep signal and a size of a downlink control information, DCI, associated with the at least one wake/sleep signal.

In some embodiments, receiving the configuration of multiple wake/sleep signal occasions further comprises receiving, such as by detection unit 34, processing circuitry 84, processor 86 and/or radio interface 82, a detection strategy; and further includes using, such as by detection unit 34, processing circuitry 84, processor 86 and/or radio interface 82, a detection strategy different from the received detection strategy based at least in part on a target detection performance. In some embodiments, the multiple wake/sleep signal occasions are comprised of multiple separate or independent time-frequency resource elements, REs. In some embodiments, the multiple separate or independent time-frequency REs are a combination of one or more search spaces with one or more control resource sets, CORESETs.

In some embodiments, the example method includes receiving, such as via radio interface 82 and/or detection unit 34 in processing circuitry 84, a configuration associated with multiple wake/sleep signal occasions, the multiple wake/sleep signal occasions to occur before a predetermined event. The method includes receiving and/or detecting, such as via radio interface 82 and/or detection unit 34 in processing circuitry 84, at least one wake/sleep signal before the predetermined event, based at least in part on the configured multiple wake/sleep signal occasions. In some embodiments, the received configuration includes a detection strategy for the WD 22 and the method further includes using a detection strategy different from the received configured detection strategy based on a target detection performance. In some embodiments, the at least one wake/sleep signal is one of at least one wake-up signal (WUS) and at least one go-to-sleep (GTS) and the multiple wake/sleep signal occasions are one of multiple WUS occasions and multiple GTS occasions. In some embodiments, the received at least one wake/sleep signal is one of a subset and all of the configured multiple wake/sleep signal occasions. In some embodiments, at least one of the configured multiple wake/sleep signal occasions and the received at least one wake/sleep signal is based on at least one of WD channel conditions, WD capabilities, network conditions, a predetermined target miss detection rate, a predetermined target false alarm rate, an interference assessment, and a selected WUS strategy.

Having described some embodiments for multiple wake-up signals for robust WD wake-up, a more detailed description of some of the embodiments is described below.

In one embodiment, a scenario is considered where the network node 16 configures the WD 22 with N wake-up-signal (WUS) occasions to monitor (where, in some embodiments, N can be any number), before the intended event for the WD 22 to wake up. In this scenario, the WUSs can be completely the same WUS, or different WUSs. Different WUSs can be, for example, formed by the same data bit scrambled by different sequences. Other possibilities of generating different WUSs, however, are not precluded. The N WUS occasions can be e.g., the ON duration, or a scheduling PDCCH.

The WUS occasions may be distributed both in time and/or frequency. To improve the detection performance, it may be beneficial if the occasions can be considered conditionally independent from each other. For example, if PDCCH-based WUS is to be used, multiple search spaces (SSs) or multiple control resource sets (CORESETS) can be defined for the WD 22 to expect the individual WUS transmissions. The occasions can have, e.g., the same frequency location and varying time locations, vice versa, or a variation in both.

In some embodiments, based on network node 16 measurements, and/or WD 22 feedback and capability information, the network node 16 can then decide, such as via configuration unit 32, to send a single WUS or multiple WUSs in each or a subset of WUS occasions that have been configured for the WD 22. Each WUS can have the same or different specifications, e.g., AL. In the worst case where the network node 16 does not have any information about the WD's 22 channel/link performance, e.g., the network node 16 can send a WUS on all the occasions with the highest possible AL.

Figure 10:
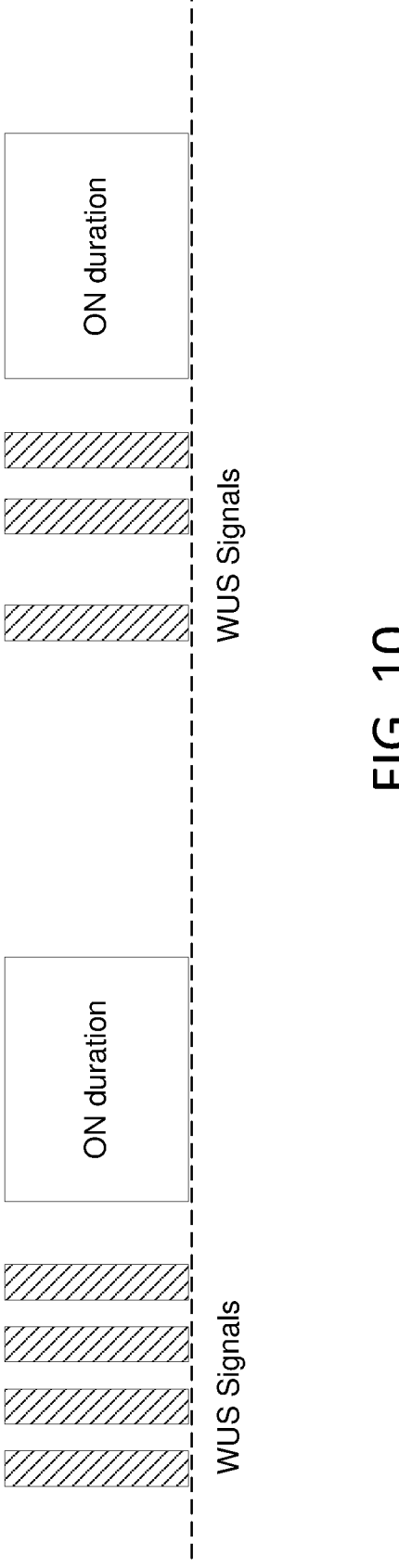
FIG. 10 illustrates an example of multiple WUS being transmitted before a WD ON duration with 4 configured WUS occasions, according to some embodiments of this disclosure.

FIG. 10 depicts an example of implementation of multiple WUSs before a WD 22 ON duration. In particular, FIG. 10 illustrates an example of multiple WUS implementations before the WD 22 ON duration, where it is assumed that the network node 16 configures the WD 22 with 4 WUS occasions. In the first time period, all 4 occasions are used to send WUS, and in the second time period, a subset of the configured WUS occasions e.g., 3 WUS occasions are used to send WUS.

In general, a maximum WUS missed detection rate may be defined, and which may be sought to be satisfied for the aggregate WUS detection. In some embodiments, the network node 16 may either individually or independently, or with assistance from the WD 22, decide, such as via configuration unit 32, about the WUS strategy that leads to the target miss detection rate. Additionally, a target false alarm rate may also be defined. However, the target false alarm rate may not be as useful as a miss detection from a network node 16 viewpoint, and can also be left for the WD 22 implementation to make sure a low false alarm rate is achieved for the WUS detection.

Herein below, using some examples, this disclosure describes at least two aspects of the of the above general concept, i.e., the network node 16 decision on the specification and number of WUSs to be sent, and the way the WD 22 should fuse/combine the multiple WUS detection instances or occasions.

For the sake of simplicity, this disclosure focuses on PDCCH-based WUS detection. However, it should be understood that the same embodiments can be beneficially applied to other WUS designs, e.g., sequence-based and so on. In general, it can be assumed that in each occasion, the individual WUS may be detected with a specific miss detection rate denoted by Pm, the occasions being independent.

Aspect 1: Network Node 16 Decision on Specification and Number of WUSs

In some embodiments, the network node 16 decides or determines, such as via configuration unit 32, to send, such as via radio interface 62, a WUS in each, or a subset of WUS occasions, which, in some embodiments, have been defined before the intended event. Furthermore, the network node 16 may decide or determine, such as via configuration unit 32, what should be the specification of each individual WUS, e.g., AL, SS, and downlink control information (DCI) size. Nevertheless, the network node 16 can consider a set of approaches to make this decision, such as via configuration unit 32.

For example, in one approach, the network node 16 may determine, such as via configuration unit 32, to send, such as via radio interface 62, the lowest number of WUSs. Based on the WD 22 channel quality measurements, the network node 16 can decide, such as via configuration unit 32, to send a PDCCH-based WUS with a high enough AL to achieve the target Pm. However, if the WD 22 capabilities cannot afford the imposed large bandwidth, the network node 16 can choose to send two or more WUSs with lower ALs until the target Pm is satisfied.

In a related implementation of the above approach, the network node 16 may not have information about the WD 22 channel, or the information may be outdated. Thus, the network node 16 can send, such as via radio interface 62, multiple WUSs with high AL (if affordable by the WD 22) to improve the miss detection rate. Additionally, multiple WUS transmissions may be preferred if, for example, the propagation environment is likely to subject the WD 22 to considerable, variable other-cell interference, assessed e.g., based on current network node 16 load and/or the variability of channel state information (CSI) reports by the WD 22. Such multiple WUS transmissions may be used by the network node 16 so as provide diversity against interference occasions.

Again, in another implementation of this approach, the network node 16 sends, such as via radio interface 62, one or additional WUSs for the sake of robustness, even if the network node 16 has determined, or is almost sure that the target Pm is achieved, even with one WUS.

In another approach, the network node 16 may determine, such as via configuration unit 32, to distribute the available WUS resources among several WDs 22, and thereby prefer to use lower ALs. As such, the network node 16 may then again decide, such as via configuration unit 32, to send multiple WUSs, such as via radio interface 62, to the WD 22 to make sure the target Pm is achieved. The network node 16 may generally prefer to transmit multiple less robust WUSs if transmission diversity is desired, and a smaller number more robust WUSs in other scenarios.

In another approach, the network node 16 may be configured, such as via configuration unit 32, to encourage using low complexity wake-up receivers (WURs) with a lower energy consumption than a main WD 22 receiver according to the techniques described herein. Such receivers (e.g., WURs) may have lower capabilities with respect to the main types of WD 22 receivers, to save power as much as possible. In such a case, again the network node 16 can decide, such as via configuration unit 32, to send, such as via radio interface 62, multiple WUSs with e.g., lower bandwidths to make sure the WUR is able to detect the WUS reliably.

Aspect 2: Multiple WUS Detection Fusion

In addition to the network node 16 deciding or determining how many WUSs and with what specifications the WUSs should be sent to the WD 22, the network node 16 can also inform, such as via radio interface 62, the WD 22 how the multiple WUS detection occasions should be inferred, or fused/combined.

In one approach, which can provide a low miss detection rate (but a high false alarm), the network node 16 may indicate to the WD 22 to assume the WUS is detected if the WUS is detected in at least one occasion. This may be referred to as the "OR fusion rule" and can be considered to be the most robust approach (or at least very robust compared to other techniques) in terms of the miss detection rate.

In this approach, the WD 22 may stop monitoring the rest of the WUSs as a result of one of the WUSs being detected e.g., by the WD 22. This may save some WD 22 power. Nevertheless, in some embodiments, such as in case the network node 16 determines or is configured to maintain a specific trade-off between the target miss detection rate and false alarm, the network node 16 can inform, such as via radio interface 62, the WD 22 to use other hard fusion rules, e.g. K out of M, majority, or AND rules.

In another approach, the network node 16 may inform, such as via radio interface 62, the WD 22 to use soft fusion techniques to infer multiple WUSs. This may be especially feasible when the WD 22 is able to maintain a stable phase reference across the WUS occasions, e.g., if the WUS occasions are close in time and/or no bandwidth part (BWP) switching is required. This may be useful, for example, when the WD 22 uses correlator-based detection, and thus soft fusion can lead to a better estimation of the correlation (compared to other detection techniques). Soft decoder techniques may also allow for combining soft input values from modulation at multiple occasions.

In some embodiments, the network node 16 may configure the fusion rule through radio resource control (RRC) signaling. However, if faster reconfiguration of fusion rule is preferred, medium access control (MAC) control element (CE), or downlink control information (DCI) signaling can also be used by the network node 16 e.g., for configuring the WD 22 according to the approaches and examples described in this disclosure.

In a related implementation of this approach, i.e., the network node 16 informing the WD 22 about the fusion rule or other rule (e.g., signaling via RRC or other signaling), the WD 22 may decide, such as via detection unit 34, to override the network node 16. For example, the WD 22 may override the rule configured by the network node 16, if the WD 22 can make sure that the target detection performance enforced by the standard, or network node 16 is achieved with another rule, which for example lowers false alarm rate.

Alternatively, the network node 16 may inform or signal to the WD 22 to choose or select a detection fusion strategy (or other strategy or rule) and based on the WD's 22 own receiver capabilities and, in some embodiments, with a condition that the WD 22 ensures or determines that the target Pm is satisfied. In some embodiments, the network node 16 is configured to detect WD 22 infringement or violation of this condition (or other enforceable conditions) by monitoring the WD 22 behavior over some WUS occasions. The same infringement or violation detection approach can be used for the case that the WD 22 has overridden the network node 16 fusion rule (or other rule) recommendation, but the target detection performance is not satisfied.

In a related implementation of an approach where multiple WUS and decision making is performed (at least partially) by the WD 22, the network node 16 can pre-configure the WD 22 with additional resources with which the WD 22 can inform the network node 16 that the WUS has been detected. This process which can be referred to as a "WUS-ACK" or WUS-acknowledge and can provide an additional level of robustness. The network node 16 may decide or determine, such as via configuration unit 32, to configure the WUS-ACK occasion (or instance or resource(s)) after each WUS, or after a number of WUSs, or simply at the end e.g., of all the configured WUSs. For example, if an OR rule is used, and the network node 16 puts or configures the WD 22 to send a WUS-ACK after any WUS which has been correctly detected, then the network node 16 can stop sending additional WUSs as soon as the WD 22 confirms the detection of WUS. In another example, if a majority rule is to be used, it makes sense to not put or configure the WUS-ACK before the WUS occasion or in the middle (i.e., before (N+1)/2th WUS).

Additional Aspects

Conditional WUS Consideration by WD

In one type of embodiment, the network node 16 informs the WD 22 about the number of WUSs and possibly their specifications. However, the WD 22 may be configured to make sure the target Pm is achieved after aggregate WUS reception, and if not (e.g., the WD 22 knows from the measurements that the WD 22 does not have a good coverage), then the WD 22 may wake up regardless of the WUs detection result. (The WD 22 may then omit WUS reception.) The WD 22 may then additionally inform the network node 16 that target WUS performance cannot be achieved with the given WUS set configuration.

Adaptation of WUS Strategy

The network node 16 may modify the WUS strategy for a given WD 22 based on previous WD 22 PDCCH/physical downlink shared channel (PDSCH) performance. In some embodiments, if with the current strategy, the WD 22 misses multiple PDSCH instances, the network node 16 may change the WUS strategy to a more robust strategy or rule (e.g., more repetitions, higher AL, etc.). Conversely, the network node 16 may relax the WUS transmission parameters if there are no indications of possible missed WUS present (e.g., the PDSCH block error rate (BLER) follows the target BLER during the link adaptation as intended).

Multiple GTS Design

Some or all of the principles provided in this disclosure may also be applied for ensuring or improving GTS (go-to-sleep signal) robustness, as compared to existing GTS techniques. Many of the aspects described above are directly applicable. In some respects, the GTS approach differs from WUS in that the false alarm performance may be guaranteed, which can lead to differences in some strategies. For example, unlike WUS, with GTS a maximum false alarm rate should generally be defined that can be tolerated. The false alarm of GTS can lead to the WD 22 sleeping while the network node 16 wants to schedule the WD 22, or is sending scheduling information to the WD 22, which in turn leads to the network node 16 losing resources and additional latency.

As such, for the fusion of multiple GTS instances, different strategies may become relevant. For example, in case the network node 16 wants to achieve the lowest false alarm rate, the network node 16 can inform the WD 22 to use an AND rule instead of an OR rule, or to apply soft fusion if that leads to a lower false alarm rate.

Furthermore, when it comes to conditional GTS considerations, in this case, if the WD 22 is not sure that the target false alarm rate is achieved, then the WD 22 may remain awake.

Some embodiments of this disclosure are intended to improve the robustness of WUS/GTS detection by sending multiple WUS/GTS over different time and frequency resources. As such time and frequency diversity can lead to improving the detection performance.

In addition, some embodiments may include one or more of the following:

Embodiment A1. A network node configured to communicate with a wireless device (WD), the network node configured to, and/or comprising a radio interface and/or comprising processing circuitry configured to:

configure the WD with multiple wake/sleep signal occasions to occur before a predetermined event; and send at least one wake/sleep signal to the WD before the predetermined event, based at least in part on the configured multiple wake/sleep signal occasions.

Embodiment A2. The network node of Embodiment A1, wherein the at least one wake/sleep signal is one of at least one wake-up signal (WUS) and at least one go-to-sleep (GTS) and the multiple wake/sleep signal occasions are one of multiple WUS occasions and multiple GTS occasions Embodiment A3. The network node of Embodiment A1, wherein the processing circuitry is further configured to determine whether to use a subset or all of the configured multiple wake/sleep signal occasions to send the at least one wake/sleep signal to the WD.

Embodiment A4. The network node of Embodiment A1, wherein the processing circuitry is further configured to at least one of configure the WD with multiple wake/sleep signal occasions and determine whether to use a subset or all of the configured multiple wake/sleep signal occasions based at least in part on at least one of WD channel conditions, WD capabilities, network conditions, a predetermined target miss detection rate, a predetermined target false alarm rate, an interference assessment, and a selected WUS strategy.

Embodiment B1. A method implemented in a network node, the method comprising:

configuring the WD with multiple wake/sleep signal occasions to occur before a predetermined event; and sending at least one wake/sleep signal to the WD before the predetermined event, based at least in part on the configured multiple wake/sleep signal occasions.

Embodiment B2. The method of Embodiment B1, wherein the at least one wake/sleep signal is one of at least one wake-up signal (WUS) and at least one go-to-sleep (GTS) and the multiple wake/sleep signal occasions are one of multiple WUS occasions and multiple GTS occasions.

Embodiment B3. The method of Embodiment B1, further comprising determining whether to use a subset or all of the configured multiple wake/sleep signal occasions to send the at least one wake/sleep signal to the WD.

Embodiment B4. The method of Embodiment B1, wherein at least one of the configuring the WD with multiple wake/sleep signal occasions and the determining whether to use a subset or all of the configured multiple wake/sleep signal occasions is based at least in part on at least one of WD channel conditions, WD capabilities, network conditions, a predetermined target miss detection rate, a predetermined target false alarm rate, an interference assessment, and a selected WUS strategy.

Embodiment C1. A wireless device (WD) configured to communicate with a network node, the WD configured to, and/or comprising a radio interface and/or processing circuitry configured to:

receive a configuration associated with multiple wake/sleep signal occasions, the multiple wake/sleep signal occasions to occur before a predetermined event; and receive and/or detect at least one wake/sleep signal before the predetermined event, based at least in part on the configured multiple wake/sleep signal occasions.

Embodiment C2. The WD of Embodiment C1, wherein the received configuration includes a detection strategy for the WD and the processing circuitry is further configured to use a detection strategy different from the received configured detection strategy based at least in part on a target detection performance.

Embodiment C3. The WD of Embodiment C1, wherein the at least one wake/sleep signal is one of at least one wake-up signal (WUS) and at least one go-to-sleep (GTS) and the multiple wake/sleep signal occasions are one of multiple WUS occasions and multiple GTS occasions Embodiment C4. The WD of Embodiment C1, wherein the received at least one wake/sleep signal is one of a subset and all of the configured multiple wake/sleep signal occasions.

Embodiment C5. The WD of Embodiment C1, wherein at least one of the configured multiple wake/sleep signal occasions and the received at least one wake/sleep signal is based at least in part on at least one of WD channel conditions, WD capabilities, network conditions, a predetermined target miss detection rate, a predetermined target false alarm rate, an interference assessment, and a selected WUS strategy.

Embodiment D1. A method implemented in a wireless device (WD), the method comprising:

receiving a configuration associated with multiple wake/sleep signal occasions, the multiple wake/sleep signal occasions to occur before a predetermined event; and receiving and/or detecting at least one wake/sleep signal before the predetermined event, based at least in part on the configured multiple wake/sleep signal occasions.

Embodiment D2. The method of Embodiment D1, wherein the received configuration includes a detection strategy for the WD and the method further includes using a detection strategy different from the received configured detection strategy based at least in part on a target detection performance.

Embodiment D3. The method of Embodiment D1, wherein the at least one wake/sleep signal is one of at least one wake-up signal (WUS) and at least one go-to-sleep (GTS) and the multiple wake/sleep signal occasions are one of multiple WUS occasions and multiple GTS occasions.

Embodiment D4. The method of Embodiment D1, wherein the received at least one wake/sleep signal is one of a subset and all of the configured multiple wake/sleep signal occasions.

Embodiment D5. The method of Embodiment D1, wherein at least one of the configured multiple wake/sleep signal occasions and the received at least one wake/sleep signal is based at least in part on at least one of WD channel conditions, WD capabilities, network conditions, a predetermined target miss detection rate, a predetermined target false alarm rate, an interference assessment, and a selected WUS strategy.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

CSI-RSRP CSI Reference Signal Received Power

CSI-RSRQ CSI Reference Signal Received Quality eMBB enhanced Mobile BroadBand

LTE Long Term Evolution

NR New Radio

PDCCH Physical Downlink Control Channel

RSRP Reference Signal Received Power

SCS Subcarrier spacing

SS-RSRP Synchronization Signal Reference Signal Received Power

SS-RSRQ Synchronization Signal Reference Signal Received Quality

TBS Transport block size

UE User Equipment

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:

configuring a wireless device (WD) with multiple wake/sleep signal occasions to occur before an ON duration for Discontinuous Reception (DRX);

determining a number of the configured multiple wake/sleep signal occasions to use to send the at least one wake/sleep signal to the WD before the ON duration for the DRX, based at least in part on at least one of network conditions, a predetermined target miss detection rate, a predetermined target false alarm rate, an interference assessment, and a selected WUS strategy;

determining whether to use a subset or all the number of the configured multiple wake/sleep signal occasions to send the at least one wake/sleep signal to the WD;

determining at least one specification of the at least one wake/sleep signal to send to the WD on at least one of the configured multiple wake/sleep signal occasions; and sending at least one wake/sleep signal to the WD before the ON duration for the DRX based at least in part on the determined number of the configured multiple wake/sleep signal occasions, wherein the at least one specification of the at least one wake/sleep signal includes at least one of an aggregation level (AL) of the at least one wake/sleep signal, a search space (SS) associated with the at least one wake/sleep signal and a size of a downlink control information (DCI) associated with the at least one wake/sleep signal.

2. The method of claim 1, wherein the at least one wake/sleep signal is one of at least one wake-up signal (WUS) and at least one go-to-sleep (GTS) and the multiple wake/sleep signal occasions are one of multiple WUS occasions and multiple GTS occasions.

3. The method of claim 1, wherein the determining the number of the configured multiple wake/sleep signal occasions to use further comprises:

determining the number of the configured multiple wake/sleep signal occasions to use to send the at least one wake/sleep signal to the WD before the ON duration for the DRX, based at least in part on at least one of WD channel conditions, at least one channel state information (CSI) report from the WD, and a WD capability.

4. The method of claim 1, wherein determining the at least one specification of the at least one wake/sleep signal further comprises:

determining the at least one specification of the at least one wake/sleep signal to send to the WD on the at least one of the configured multiple wake/sleep signal occasions before the ON duration for the DRX based at least in part on at least one of WD channel conditions, at least one channel state information (CSI) report from the WD, and a WD capability.

5. The method of claim 1, further comprising:

determining how many times the WD missed a physical downlink control channel (PDCCH) transmission; and based on the determination, adjusting at least one of a number of the configured multiple wake/sleep signal occasions to use and at least one specification of the at least one wake/sleep signal to send to the WD on at least one of the configured multiple wake/sleep signal occasions.

6. The method of claim 1, wherein the multiple wake/sleep signal occasions are comprised of one of multiple separate and independent time-frequency resource elements (REs).

7. The method of claim 6, wherein the one of the multiple separate and independent time-frequency REs are a combination of one or more search spaces with one or more control resource sets (CORESETs).

8. A method implemented in a wireless device (WD), the method comprising:

receiving a configuration of multiple wake/sleep signal occasions, the multiple wake/sleep signal occasions to occur before an ON duration for Discontinuous Reception (DRX), wherein the multiple wake/sleep signal occasions comprise a determined number of the configured multiple wake/sleep signal occasions to use to send the at least one wake/sleep signal to the WD before the ON duration for the DRX, wherein the received at least one wake/sleep signal is one of a subset and all configured multiple wake/sleep signal occasions, and wherein the determination is based on at least in part on at least one of network conditions, a predetermined target miss detection rate, a predetermined target false alarm rate, an interference assessment, and a selected WUS strategy; and detecting at least one wake/sleep signal before the ON duration for the DRX based at least in part on the determined number of the configured multiple wake/sleep signal occasions, wherein:

the detected at least one wake/sleep signal contains at least one specification determined by a network node before sending it to the UE before the ON duration for the DRX based at least in part on the determined number of the configured multiple wake/sleep signal occasions, the at least one specification of the at least one wake/sleep signal includes at least one of an aggregation level (AL) of the at least one wake/sleep signal, a search space (SS) associated with the at least one wake/sleep signal and a size of a downlink control information (DCI) associated with the at least one wake/sleep signal.

9. The method of claim 8, wherein the at least one wake/sleep signal is one of at least one wake-up signal (WUS) and at least one go-to-sleep (GTS) and the multiple wake/sleep signal occasions are one of multiple WUS occasions and multiple GTS occasions.

10. The method of claim 8, wherein the number of the configured multiple wake/sleep signal occasions on which the at least one wake/sleep signal is detected before the ON duration for the DRX is further based at least in part on at least one of WD channel conditions, at least one channel state information (CSI) report from the WD, and a WD capability.

11. The method of claim 8, wherein the at least one specification of the at least one wake/sleep signal detected by the WD before the ON duration for the DRX is further based at least in part on at least one of WD channel conditions, at least one channel state information (CSI) report from the WD, and a WD capability.

12. The method of claim 8, wherein:
receiving the configuration of multiple wake/sleep signal occasions further comprises receiving a detection strategy; and
further comprising using a detection strategy different from the received detection strategy based at least in part on a target detection performance.

13. The method of claim 8, wherein the multiple wake/sleep signal occasions are comprised of one of multiple separate and independent time-frequency resource elements (REs).

14. The method of claim 13, wherein the at least one of the multiple separate and independent time-frequency REs are a combination of one or more search spaces with one or more control resource sets (CORESETs).

15. A network node configured to communicate with a wireless device (WD), the network node comprising processing circuitry, the processing circuitry configured to cause the network node to:
configure the WD with multiple wake/sleep signal occasions to occur before an ON duration for Discontinuous Reception (DRX);
determine a number of the configured multiple wake/sleep signal occasions to use to send the at least one wake/sleep signal to the WD before the ON duration for the DRX, based at least in part on at least one of network conditions, a predetermined target miss detection rate, a predetermined target false alarm rate, an interference assessment, and a selected WUS strategy;
determine whether to use a subset or all the number of the configured multiple wake/sleep signal occasions to send the at least one wake/sleep signal to the WD;
determine at least one specification of the at least one wake/sleep signal to send to the WD on at least one of the configured multiple wake/sleep signal occasions; and
send at least one wake/sleep signal to the WD before the ON duration for the DRX based at least in part on the determined number of the configured multiple wake/sleep signal occasions, wherein the at least one specification of the at least one wake/sleep signal includes at least one of an aggregation level (AL) of the at least one wake/sleep signal, a search space (SS) associated with the at least one wake/sleep signal and a size of a downlink control information (DCI) associated with the at least one wake/sleep signal.

16. The network node of claim 15, wherein the at least one wake/sleep signal is one of at least one wake-up signal (WUS) and at least one go-to-sleep (GTS) and the multiple wake/sleep signal occasions are one of multiple WUS occasions and multiple GTS occasions.

17. The network node of claim 15, wherein the processing circuitry is further configured to cause the network node to determine the number of the configured multiple wake/sleep signal occasions to use by being configured to cause the network node to:
determine the number of the configured multiple wake/sleep signal occasions to use to send the at least one wake/sleep signal to the WD before the ON duration for the DRX, based at least in part on at least one of WD channel conditions, at least one channel state information (CSI) report from the WD, and a WD capability.

18. The network node of claim 15, wherein the processing circuitry is further configured to cause the network node to determine the at least one specification of the at least one wake/sleep signal by being configured to cause the network node to:
determine the at least one specification of the at least one wake/sleep signal to send to the WD on the at least one of the configured multiple wake/sleep signal occasions before the ON duration for the DRX based at least in part on at least one of WD channel conditions, at least one channel state information (CSI) report from the WD, and a WD capability.

19. The network node of claim 15, wherein the processing circuitry is further configured to cause the network node to:
determine how many times the WD missed a physical downlink control channel (PDCCH) transmission; and
based on the determination, adjust at least one of a number of the configured multiple wake/sleep signal occasions to use and at least one specification of the at least one wake/sleep signal to send to the WD on at least one of the configured multiple wake/sleep signal occasions.

20. The network node of claim 15, wherein the multiple wake/sleep signal occasions are comprised of one of multiple separate and independent time-frequency resource elements (REs).

21. The network node of claim 20, wherein the one of the multiple separate and independent time-frequency REs are a combination of one or more search spaces with one or more control resource sets (CORESETs).

22. A wireless device (WD) configured to communicate with a network node, the WD comprising processing circuitry, the processing circuitry configured to cause the WD to:
receive a configuration of multiple wake/sleep signal occasions, the multiple wake/sleep signal occasions to occur before an ON duration for Discontinuous Reception (DRX), wherein the multiple wake/sleep signal occasions comprise a determined number of the configured multiple wake/sleep signal occasions to use to send the at least one wake/sleep signal to the WD before the ON duration for the DRX, wherein the received at least one wake/sleep signal is one of a subset and all configured multiple wake/sleep signal occasions, and wherein the determination is based on at least in part on at least one of network conditions, a predetermined target miss detection rate, a predetermined target false alarm rate, an interference assessment, and a selected WUS strategy; and
detect at least one wake/sleep signal before the ON duration for the DRX based at least in part on the determined number of the configured multiple wake/sleep signal occasions,
wherein:
the detected at least one wake/sleep signal contains at least one specification determined by the network node before sending it to the UE before the ON duration for the DRX based at least in part on the determined number of the configured multiple wake/sleep signal occasions, the at least one specification of the at least one wake/sleep signal includes at least one of an aggregation level (AL) of the at least one wake/sleep signal, a search space (SS) associated with the at least one wake/sleep signal and a size of a downlink control information (DCI) associated with the at least one wake/sleep signal.

23. The WD of claim 22, wherein the at least one wake/sleep signal is one of at least one wake-up signal (WUS) and at least one go-to-sleep (GTS) and the multiple wake/sleep signal occasions are one of multiple WUS occasions and multiple GTS occasions.

24. The WD of claim 22, wherein the number of the configured multiple wake/sleep signal occasions on which the at least one wake/sleep signal is detected before the ON duration for the DRX is based at least in part on at least one of WD channel conditions, at least one channel state information (CSI) report from the WD, a WD capability, network conditions, a predetermined target miss detection rate, a predetermined target false alarm rate, an interference assessment and a selected WUS strategy.

25. The WD of claim 24, wherein the processing circuitry is further configured to cause the WD to:

receive the configuration of multiple wake/sleep signal occasions by being configured to receive a detection strategy; and use a detection strategy different from the received detection strategy based at least in part on a target detection performance.

26. The WD of claim 24, wherein the multiple wake/sleep signal occasions are comprised of one of multiple separate and independent time-frequency resource elements (REs).

27. The WD of claim 26, wherein the one of the multiple separate and independent time-frequency REs are a combination of one or more search spaces with one or more control resource sets (CORESETs).

28. The WD of claim 22, wherein the at least one specification of the at least one wake/sleep signal detected by the WD before the ON duration for the DRX is further based at least in part on at least one of WD channel conditions, at least one channel state information (CSI) report from the WD, and a WD capability.

* * * * *